(12) United States Patent
Saito et al.

(10) Patent No.: US 11,554,455 B2
(45) Date of Patent: Jan. 17, 2023

(54) PROCESSING APPARATUS

(71) Applicant: DISCO CORPORATION, Tokyo (JP)

(72) Inventors: Yoshinobu Saito, Tokyo (JP);
Yoshikuni Migiyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 228 days.

(21) Appl. No.: 17/171,200

(22) Filed: Feb. 9, 2021

(65) Prior Publication Data
US 2021/0260711 A1 Aug. 26, 2021

(30) Foreign Application Priority Data
Feb. 26, 2020 (JP) .............................. JP2020-030334

(51) Int. Cl.
| | | |
|---|---|---|
| *B23Q 11/12* | (2006.01) | |
| *B23Q 17/00* | (2006.01) | |
| *B23Q 17/24* | (2006.01) | |
| *C09K 11/08* | (2006.01) | |
| *C09K 11/77* | (2006.01) | |
| *G01M 3/20* | (2006.01) | |
| *B23Q 5/32* | (2006.01) | |

(52) U.S. Cl.
CPC .......... *B23Q 17/007* (2013.01); *B23Q 11/125* (2013.01); *B23Q 17/2409* (2013.01); *C09K 11/0883* (2013.01); *C09K 11/7787* (2013.01); *C09K 11/77928* (2021.01); *B23Q 5/326* (2013.01); *B23Q 2717/00* (2013.01); *G01M 3/20* (2013.01)

(58) Field of Classification Search
CPC .............. B23Q 17/007; B23Q 17/2409; B23Q 11/125; G01M 3/20
USPC ............................................................ 73/40
See application file for complete search history.

(56) References Cited

U.S. PATENT DOCUMENTS

| | | | | |
|---|---|---|---|---|
| 5,974,860 | A | 11/1999 | Kuroda et al. | |
| 9,791,407 | B2 * | 10/2017 | Urey | G01N 27/447 |
| 11,054,333 | B2 * | 7/2021 | Boston | G01M 3/38 |

FOREIGN PATENT DOCUMENTS

JP 2017180602 A 10/2017

OTHER PUBLICATIONS

Search report issued in counterpart Singapore patent application No. 10202101531S, dated Feb. 1, 2022.

\* cited by examiner

*Primary Examiner* — Christopher M Raabe
(74) *Attorney, Agent, or Firm* — Greer Burns & Crain Ltd.

(57) ABSTRACT

A processing apparatus includes a chuck table having a holding surface for holding a workpiece; a horizontal moving mechanism that moves the chuck table in a horizontal direction and is supplied with a first oil; and a vertical moving mechanism that moves a processing unit in a vertical direction and is supplied with a second oil. Before mounting the workpiece on the holding surface, the holding surface is imaged by a camera while being irradiated with light, and it is examined whether or not the picked-up image is emitting light. If there is a light-emitting part in the picked-up image, it is determined that oil is adhered to the light-emitting part.

3 Claims, 1 Drawing Sheet

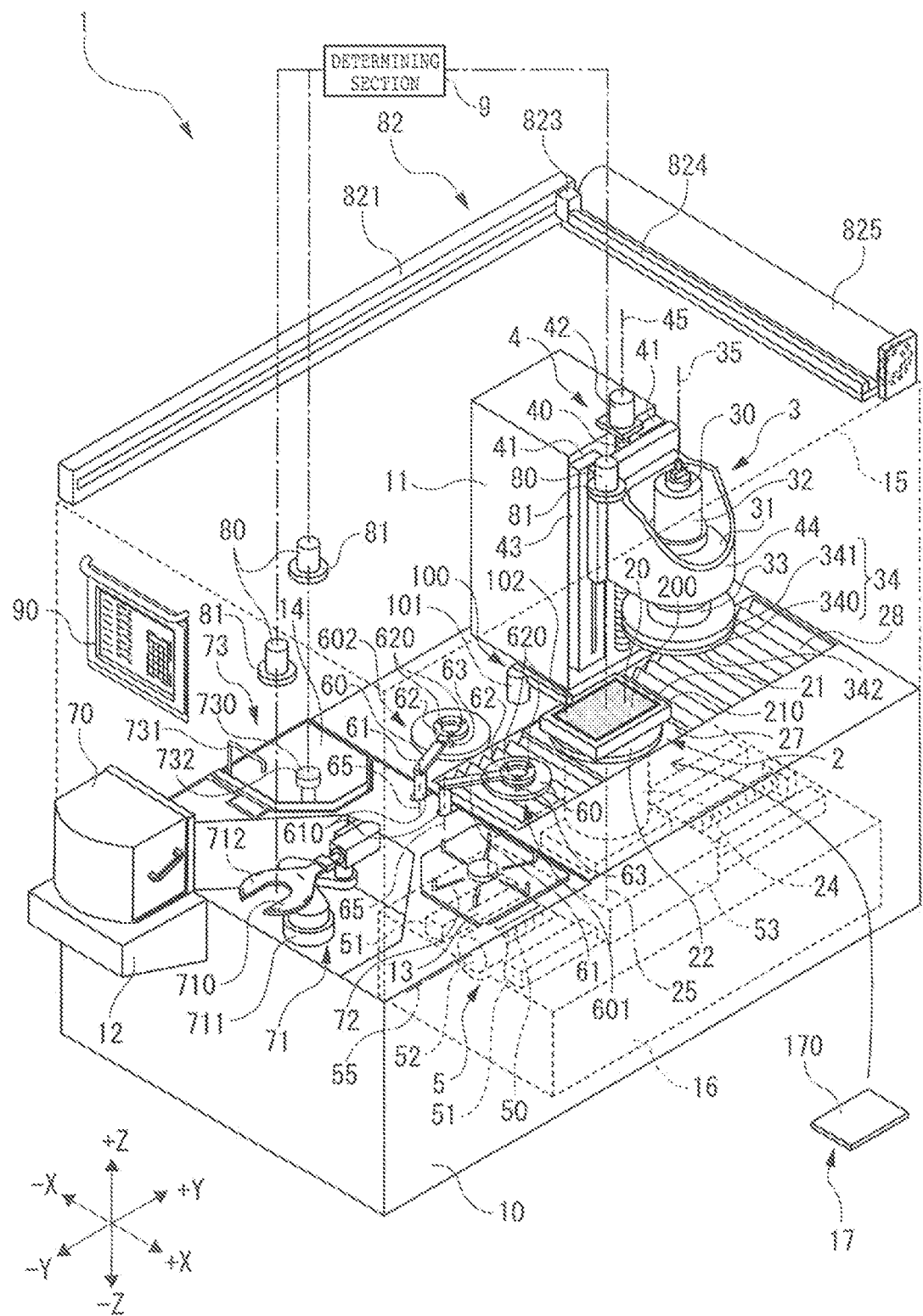

PROCESSING APPARATUS

BACKGROUND OF THE INVENTION

Field of the Invention

The present invention relates to a processing apparatus.

Description of the Related Art

There is a processing apparatus of a type which includes a chuck table that holds a workpiece, a processing unit that processes the workpiece held by the chuck table, a carrying-in assembly that carries in the workpiece onto the chuck table, and a carrying-out assembly that carries out the workpiece from the chuck table. Each of the carrying-in assembly and the carrying-out assembly includes a holding section that holds the workpiece, a horizontal moving mechanism that moves the holding section horizontally, and a vertical moving mechanism that moves the holding section in a vertical direction.

In addition, the processing apparatus includes another horizontal moving mechanism that reciprocally moves the chuck table in a horizontal direction between a carrying-in/out position where the workpiece is carried in and out and a processing position where processing by a processing unit is conducted. Further, the processing apparatus includes another vertical moving mechanism that moves the processing unit in a direction perpendicular to a holding surface.

The other horizontal moving mechanism and the vertical moving mechanism as described above include guide rails extending in a moving direction, a ball screw disposed in parallel to the guide rails, and a motor that rotates the ball screw. As disclosed in Japanese Patent Laid-open No. 2017-180602, oil is applied to the guide rails and the ball screws.

SUMMARY OF THE INVENTION

At the time of an operation of supplying oil to the guide rails and the ball screws by an operator, or at the time of an adjusting operation, the oil may be adhered to the operator's hands or the like, and, due to the operator operating in a processing chamber without noticing the adhesion of the oil, the oil having adhered to the operator's hands or the like may adhere to the inside of the processing chamber. If processing of the workpiece is conducted in the processing chamber, in a state in which the oil is adhered to the inside of the processing chamber, a problem of oil contamination of the workpiece or the like arises due to contact of the workpiece with component parts of a processing apparatus disposed in the processing chamber, or due to adhesion of the oil adhered to the component parts to the workpiece by way of a processing liquid.

Accordingly, it is an object of the present invention to provide a processing apparatus that is able to prevent oil contamination of a workpiece held on a holding surface of a chuck table.

In accordance with an aspect of the present invention, there is provided a processing apparatus including a chuck table having a holding surface for holding a workpiece; a processing unit that processes the workpiece held on the holding surface; a horizontal moving mechanism that moves the chuck table in a horizontal direction relative to the processing unit and is supplied with a first oil containing first photoluminescence particles; a vertical moving mechanism that moves the processing unit in a vertical direction relative to the chuck table and is supplied with a second oil containing second photoluminescence particles; a camera that images the holding surface of the chuck table; and a light source that casts light to an imaging area of the camera inclusive of the holding surface. In the processing apparatus, presence or absence of adhesion of the first oil and/or the second oil to the holding surface can be detected based on an image of the holding surface picked up by the camera.

Preferably, the first photoluminescence particles emit light in a first color when irradiated with light of the light source, the second photoluminescence particles emit light in a second color different from the first color when irradiated with light of the light source, and the source of the scattered oil adhered to the holding surface is identified by observing the image picked up by the camera.

Preferably, the first and second photoluminescence particles have a light accumulating property.

According to the present invention, by imaging the holding surface of the chuck table by use of the camera, determining whether or not the first photoluminescence particles or the second photoluminescence particles are present, and thereby examining whether or not oil contamination of the holding surface has occurred, it is possible to prevent oil contamination of the workpiece held on the holding surface.

In addition, since the first photoluminescence particles and the second photoluminescence particles emit light in different colors when irradiated with light by the light, by determining the color of light emitted by a light-emitting part present in the picked-up image, it is possible to determine the source of the scattered oil adhered to the holding surface.

Further, since the first photoluminescence particles or the second photoluminescence particles or both of them having a light accumulating property accumulate the light with which the holding surface is irradiated, it is possible to determine that adhesion of the oil has occurred, based on the light, by using the phenomenon of continuous emission of light for a predetermined period of time even after the irradiation with light by the light is stopped.

The above and other objects, features and advantages of the present invention and the manner of realizing them will become more apparent, and the invention itself will best be understood from a study of the following description and appended claims with reference to the attached drawing showing a preferred embodiment of the invention.

BRIEF DESCRIPTION OF THE DRAWING

FIG. 1 is a perspective view depicting a processing apparatus as a whole.

DETAILED DESCRIPTION OF THE PREFERRED EMBODIMENT

1 Configuration of Processing Apparatus

A processing apparatus 1 depicted in FIG. 1 is a processing apparatus that processes a workpiece 17 held on a holding surface 200 of a chuck table 2 by use of a processing unit 3. The configuration of the processing apparatus 1 will be described below. As illustrated in FIG. 1, the processing apparatus 1 includes a base 10 extended in a Y-axis direction and a column 11 erected on a +Y direction side of the base 10.

A rectangular parallelepiped apparatus cover 15 is disposed on the base 10. A rectangular parallelepiped space partitioned by the apparatus cover 15 is a space where carrying-in and carrying-out of the workpiece 17 and grinding of the workpiece 17 are conducted.

The chuck table 2 which is plate-shaped is disposed on the base 10. The chuck table 2 is detachably attached to a mount 22. The chuck table 2 includes a suction chuck 20 and a frame body 21 supporting the suction chuck 20. An upper surface of the suction chuck 20 is the holding surface 200 on which the workpiece 17 is to be held. An upper surface 210 of the frame body 21 is formed to be flush with the holding surface 200.

Unillustrated suction means and the like are connected to the holding surface 200. When a suction force is exhibited by use of the unillustrated suction means and the like in a state in which the workpiece 17 is placed on the holding surface 200, the suction force generated is thereby transmitted to the holding surface 200, and the workpiece 17 is suction held on the holding surface 200.

A rotating mechanism 24 having an unillustrated motor and the like is connected to a lower side of the mount 22. By use of the rotating mechanism 24, the chuck table 2 can be rotated around an axis in a Z-axis direction that passes through the center of the chuck table 2.

An internal base 16 is disposed inside the base 10. A horizontal moving mechanism 5 that moves the chuck table 2 in a horizontal direction is disposed on the internal base 16. The horizontal moving mechanism 5 includes a ball screw 50 having a rotational axis 55 in the Y-axis direction, a pair of guide rails 51 disposed in parallel to the ball screw 50, a Y-axis motor 52 connected to the ball screw 50 and configured to rotate the ball screw 50 with the rotational axis 55 as an axis, and a moving plate 53 of which a nut at a bottom portion thereof is in screw engagement with the ball screw 50 and which is moved in the Y-axis direction along the guide rails 51. A rotating mechanism 24 is disposed on an upper surface 530 of the moving plate 53.

When the ball screw 50 is driven by the Y-axis motor 52 and the ball screw 50 is rotated with the rotational axis 55 as an axis, the moving plate 53 is attendantly moved in the Y-axis direction while being guided by the guide rails 51, and the rotating mechanism 24 supported on the moving plate 53, the mount 22 connected to the rotating mechanism 24, and the chuck table 2 mounted to the mount 22 are moved in the Y-axis direction as one body with the moving plate 53.

In addition, a cover 27 and a bellows 28 connected to the cover 27 in a freely contractable and extendable manner are disposed in the periphery of the chuck table 2. For example, when the chuck table 2 is driven by the horizontal moving mechanism 5 to move in the Y-axis direction, the cover 27 is moved in the Y-axis direction together with the chuck table 2, and the bellows 28 is contracted or extended.

A vertical moving mechanism 4 supporting the processing unit 3 in a vertically movable manner is disposed on a side surface on a +X direction side of the column 11. The processing unit 3 includes a spindle 30 having a rotational axis 35 in the Z-axis direction, a housing 31 supporting the spindle 30 in a rotatable manner, a spindle motor 32 rotationally driving the spindle 30 with the rotational axis 35 as an axis, a disk-shaped mount 33 connected to a lower end of the spindle 30, and a grinding wheel 34 detachably attached to a lower surface of the mount 33.

The grinding wheel 34 includes a wheel base 341 and a plurality of substantially rectangular parallelepiped shaped grindstones 340 arranged in an annular pattern on a lower surface of the wheel base 341, and lower surfaces of the grindstones 340 are grinding surfaces 342 for grinding the workpiece 17.

The vertical moving mechanism 4 includes a ball screw 40 having a rotational axis 45 in the Z-axis direction, a pair of guide rails 41 disposed in parallel to the ball screw 40, a Z-axis motor 42 that rotates the ball screw 40 with the rotational axis 45 as an axis, a lift plate 43 of which a nut in the inside thereof is in screw engagement with the ball screw 40 and side surfaces of which make sliding contact with the guide rails 41, and a holder 44 connected to the lift plate 43 and configured to support the processing unit 3.

When the ball screw 40 is driven by the Z-axis motor 42 and the ball screw 40 is rotated with the rotational axis 45 as an axis, the lift plate 43 is attendantly vertically moved in the Z-axis direction while being guided by the guide rails 41, and the processing unit 3 held by the holder 44 is moved in the Z-axis direction.

A first oil containing first photoluminescence particles is applied to the horizontal moving mechanism 5. In addition, a second oil containing second photoluminescence particles is applied to the vertical moving mechanism 4.

The first photoluminescence particles are, for example, phosphor that emits light when externally irradiated with light such as a material obtained by adding $Ce^{3+}$ to oxynitride, a material obtained by adding $Eu^{2+}$ to oxynitride, a material obtained by adding $Eu^{2+}$ to α-SIALON, or a material obtained by adding $Eu^{2+}$ to $CaAlSiN_3$. The second photoluminescence particles are phosphor of a kind different from that of the first photoluminescence particles.

In the following, the first photoluminescence particles will be a material obtained by adding $Ce^{3+}$ to oxynitride, and the second photoluminescence particles will be a material obtained by adding $Eu^{2+}$ to oxynitride, but the first photoluminescence particles and the second photoluminescence particles are not limited to these.

Here, it is known that the material obtained by adding $Ce^{3+}$ to oxynitride emits light in blue when irradiated with light, the material obtained by adding $Eu^{2+}$ to oxynitride emits light in green when irradiated with light, the material obtained by adding $Eu^{2+}$ to a-SIALON emits light in yellow when irradiated with light, and the material obtained by adding $Eu^{2+}$ to $CaAlSiN_3$ emits light in red when irradiated with light. Accordingly, in the present embodiment, the first photoluminescence particles emit light in blue when irradiated with light, and the second photoluminescence particles emit light in green when irradiated with light.

In addition, the first photoluminescence particles and the second photoluminescence particles have a light accumulating property (phosphorescent property), and even when irradiation with light is stopped after irradiating both particles with light for a predetermined period of time, both particles continue emitting light for a predetermined period of time.

For example, a thickness measuring unit 100 is disposed on the base 10. The thickness measuring unit 100 includes, for example, a housing 101 disposed on a −X direction side on the base 10 of the processing apparatus 1. An upper surface height gauge 102 is disposed on a side surface of the housing 101. For example, in a state in which the workpiece 17 is held on the holding surface 200, a probe of the upper surface height gauge 102 is brought into contact with an upper surface 170 of the workpiece 17, whereby the height of the upper surface 170 of the workpiece 17 can be measured.

A cassette mounting section 12 is provided on a −Y direction side of the base 10. A cassette 70 is mounted on the cassette mounting section 12. The workpiece 17 yet to be ground is accommodated in the cassette 70. In addition, the workpiece 17 having undergone grinding can be accommodated in the cassette 70.

A robot 71 is disposed on the +Y direction side of the cassette 70. The robot 71 includes a hand 710 and a shaft section 711 supporting the hand 710 in a slewable manner. An upper surface of the hand 710 is a holding surface 712 on which the workpiece 17 is to be held. By taking out the workpiece 17 accommodated in the cassette 70 from the cassette 70 by use of the hand 710 and slewing the hand 710 with the shaft section 711 as an axis, the workpiece 17 can be carried.

A temporary placing region 13 where the workpiece 17 yet to be ground is temporarily placed is disposed on the +X direction side in a movable region of the hand 710, and a cleaning region 14 where the workpiece 17 having undergone grinding is cleaned is provided on the −X direction side in the movable region of the hand 710.

Positioning means 72 is disposed in the temporary placing region 13. The workpiece 17 carried out from the cassette 70 and placed in the temporary placing region 13 is positioned to a predetermined position by the positioning means 72.

A spinner cleaning unit 73 is disposed in the cleaning region 14. The spinner cleaning unit 73 includes a spinner table 730 on which the workpiece 17 is to be held and a cleaning water supply nozzle 731 for jetting cleaning water toward the workpiece 17 held by the spinner table 730. An upper surface of the spinner table 730 is a holding surface 732 for holding the workpiece 17.

For example, by supplying cleaning water from the cleaning water supply nozzle 731, in a state in which the workpiece 17 having undergone grinding is mounted on the holding surface 732 of the spinner table 730, the workpiece 17 can be cleaned.

A carrying-in assembly 601 for carrying in the workpiece 17 positioned by the positioning means 72 onto the chuck table 2 is disposed at a position adjacent to the temporary placing region 13. The carrying-in assembly 601 includes a disk-shaped pad 60 and an arm 61 suspending the pad 60 in a vertically movable manner. A tubular shaft section 610 having a rotational axis 65 in the Z-axis direction is connected to an end portion of the arm 61. For example, an unillustrated rotating mechanism for rotating the shaft section 610 with the rotational axis 65 as an axis or the like is connected to the shaft section 610.

An annular member 62 is connected to that end portion of the arm 61 which is not connected to the shaft section 610. The annular member 62 is penetratingly formed with, for example, three through-holes 620 at regular intervals on the circle circumference, and screws 63 (of which only one is depicted in FIG. 1) penetrate the respective through-holes 620 and are further screw engaged with the pad 60. A flange section 630 of the screw 63 is formed to be larger in diameter than the through-hole 620, and the screw 63 is suspended by the annular member 62 together with the pad 60, in a state in which a falling range of the screw 63 is limited.

For example, when a pushing force in the +Z direction is exerted from the upper surface 170 of the workpiece 17 on a lower surface of the pad 60 when the upper surface 170 of the workpiece 17 and the lower surface of the pad 60 are brought into contact with each other by lowering of the pad 60 onto the upper surface 170 of the workpiece 17, the pad 60 and the screws 63 are raised in the +Z direction relative to the annular member 62.

A carrying-out assembly 602 is disposed on the −X direction side of the carrying-in assembly 601. Since the carrying-out assembly 602 has a configuration similar to that of the carrying-in assembly 601, its components are denoted by similar reference symbols, and descriptions thereof are omitted.

The processing apparatus 1 includes three cameras 80 that image the holding surface 200 of the suction chuck 20 of the chuck table 2, the holding surface 712 of the hand 710 of the robot 71, and the holding surface 732 of the spinner table 730 of the spinner cleaning unit 73. The cameras 80 are disposed on the upper side of the holding surfaces 200, 712, and 732. The holding surfaces 200, 712, and 732 are imaging areas of the cameras 80.

The processing apparatus 1 includes a light source 81 that casts light to the holding surface 200 of the suction chuck 20 of the chuck table 2, the holding surface 712 of the hand 710 of the robot 71, and the holding surface 732 of the spinner table 730 of the spinner cleaning unit 73, which are imaging areas of the cameras 80. Ultraviolet rays or visible light is cast from the light source 81. Either one of ultraviolet rays and visible light can be selected and applied from the light source 81. The cameras 80 can transmit information concerning images picked up by the cameras 80 to a determining section 9.

Note that, instead of selecting either one of ultraviolet rays and visible light, light obtained by mixing ultraviolet rays and visible light may be applied. Further, infrared rays may be mixed with the mixed light. In other words, it is recommendable to apply light containing a wavelength for exciting the photoluminescence particles.

The processing apparatus 1 includes a determining section 9 that determines whether or not the photoluminescence particles are contained in the picked-up image. The determining section 9 can receive the images picked up by the cameras 80. The determining section 9 has an image recognition mechanism or the like and can determine whether or not the photoluminescence particles are contained in the images picked up by the cameras 80. The determining section 9 includes a storage device such as an unillustrated memory, and the storage device can store images picked up by the cameras 80.

A touch panel 90 having an inputting function of inputting processing conditions of grinding and the like, a displaying function of displaying an error that occurred during grinding or the like, and the like is disposed on a side surface on the −Y direction side of the apparatus cover 15. For example, the touch panel 90 can display the images picked up by use of the cameras 80.

2 Operation of Processing Apparatus

At the time of grinding the workpiece 17 by use of the processing apparatus 1, first, one sheet of the workpieces 17 accommodated in the cassette 70 is taken out by use of the robot 71 and placed in the temporary placing region 13. When the workpiece 17 is placed in the temporary placing region 13, positioning of the workpiece 17 by the positioning means 72 is performed.

After the positioning of the workpiece 17 by the positioning means 72 is conducted, the workpiece 17 is mounted on the holding surface 200 of the chuck table 2 by use of the carrying-in assembly 601, and unillustrated suction means or the like is operated. As a result, a suction force generated is transmitted to the holding surface 200, and the workpiece 17 is suction held on the holding surface 200.

Then, in a state in which the workpiece 17 is suction held on the holding surface 200, the chuck table 2 is moved in the +Y direction by use of the horizontal moving mechanism 5 and is positioned under the processing unit 3. Next, the chuck table 2 is rotated with the rotational axis 25 as an axis by use of the rotating mechanism 24, whereby the workpiece 17 held on the holding surface 200 is rotated, and the grindstones 340 are rotated with the rotational axis 35 as an axis by use of the spindle motor 32.

In a state in which the workpiece 17 is being rotated with the rotational axis 25 as an axis and the grindstones 340 are being rotated with the rotational axis 35 as an axis, the grindstones 340 are lowered in the −Z direction by use of the vertical moving mechanism 4, and the grinding surfaces 342 of the grindstones 340 are brought into contact with the upper surface 170 of the workpiece 17. In a state in which the grinding surfaces 342 are in contact with the upper surface 170 of the workpiece 17, the grindstones 340 are further lowered in the −Z direction, whereby the workpiece 17 is ground.

During grinding of the workpiece 17, measurement of the thickness of the workpiece 17 is conducted by use of the thickness measuring unit 100. When the workpiece 17 has been ground to a predetermined thickness, grinding is finished. After the grinding, the workpiece 17 is positioned in the cleaning region 14 by use of the carrying-out assembly 602, and the upper surface 170 is cleaned by use of the spinner cleaning unit 73. Then, the workpiece 17 is accommodated into the cassette 70 by use of the robot 71.

In the processing of the workpiece 17 by use of the processing apparatus 1 described above, whether or not oil contamination is present on the holding surface 200 of the chuck table 2 or the like is examined before the workpiece 17 is placed on the holding surface 200. An operation of the processing apparatus 1 at the time of examining the presence or absence of oil contamination will be described below.

First, by use of light-shielding means 82, a darkroom is formed by shielding external light such that external light does not impinge on the holding surface 200 of the chuck table 2 that is one of irradiation areas. Next, while being irradiated with ultraviolet rays by use of the light source 81, the holding surface 200 is imaged by use of the camera 80. Information concerning the thus picked-up image is transmitted to the determining section 9, and is stored in an unillustrated storage device or the like provided in the determining section 9.

Then, whether or not the first photoluminescence particles or the second photoluminescence particles are present in the picked-up image is determined by the determining section 9. When it is determined by the determining section 9 that the first photoluminescence particles or the second photoluminescence particles are present in the picked-up image, it is found that oil is adhered to the imaging area.

In this instance, the first photoluminescence particles which are a material obtained by adding $Ce^{3+}$ to oxynitride emit light in blue when irradiated with light by the light source 81; therefore, for example, when a part emitting light in blue is present in the picked-up image, it is found that the first oil containing the first photoluminescence particles is adhered to the light-emitting part and that the source of the scattered oil is the horizontal moving mechanism 5 to which the first oil has been applied.

In addition, the second photoluminescence particles which are a material obtained by adding $Eu^{2+}$ to oxynitride emit light in green when irradiated with light by the light source 81; therefore, for example, when a part emitting light in green is present in the picked-up image after maintenance, it is found that the second oil containing the second photoluminescence particles is adhered to the light-emitting part and that the source of the scattered oil is the vertical moving mechanism 4 to which the second oil has been applied.

In this way, by using the properties that the first photoluminescence particles and the second photoluminescence particles emit light in different colors when irradiated with light by the light source 81, it is possible to determine that a light-emitting part in what color is present in the picked-up image. Thus, by recognizing beforehand respectively the part to which the first oil containing the first photoluminescence particles is applied and the part to which the second oil containing the second photoluminescence particles is applied, the source of the scattered oil adhered to the holding surface 200 can be determined.

In addition, the configuration of an operation of the processing apparatus 1 for determining the presence or absence of oil contamination may be a configuration in which, after the holding surface 200 is irradiated with ultraviolet rays for a predetermined period of time by use of the light source 81, the irradiation with ultraviolet rays by the light source 81 is stopped, and the holding surface 200 is imaged by use of the camera 80, instead of the configuration in which the holding surface 200 is imaged by use of the camera 80 while being irradiated with ultraviolet rays with use of the light source 81 as described above.

In this instance, in the case where oil is adhered to the holding surface 200, the first photoluminescence particles or the second photoluminescence particles or both of them that have a light accumulating property accumulate the ultraviolet rays with which the holding surface 200 is irradiated. Thus, since the part stained with the oil continues emitting light for a predetermined period of time even after the irradiation with ultraviolet rays by the light source 81 is stopped, it can be determined that the oil is adhering to the light-emitting part. Also in such a configuration, in the case where there is a light-emitting part, by recognizing the color in which the light-emitting part emits light, the source of the scattered oil adhered to the imaging area can be found.

Note that the ultraviolet rays may be changed to visible light. In addition, mixed light of ultraviolet rays and visible light may also be adopted. Further, infrared rays may be mixed with the mixed light. In other words, it is recommendable to apply light containing a wavelength for exciting the photoluminescence particles.

As a configuration for determining whether or not oil is adhered, for example, adoptable is a configuration in which a picked-up image is displayed on the touch panel 90, the operator recognizes whether or not a light-emitting part is present by looking at the picked-up image displayed, and the operator determines whether or not oil is adhered to the imaging area.

For example, there is a case in which a light-emitting part is found present in an image picked up by the camera 80 but it is difficult to determine whether or not the light-emitting part has arisen from oil contamination. In order to prevent this problem, for example, before maintenance of the processing apparatus 1, in a state in which the first oil is not applied to the horizontal moving mechanism 5 and the second oil is not applied to the vertical moving mechanism 4, the holding surface 200 may be imaged by use of the camera 80 while being irradiated with ultraviolet rays with use of the light source 81, and the thus picked-up image is preliminarily stored in the determining section 9. Then, the picked-up image for comparison to which oil is not adhered and which is preliminarily stored and the picked-up image which is thereafter picked up by the camera and which has the light-emitting part are compared with each other, whereby whether or not the oil is adhering to the light-emitting part can easily be determined.

By imaging the holding surface 200 of the chuck table 2 by use of the camera 80, determining whether or not the first photoluminescence particles or the second photoluminescence particles are present in the picked-up image, and examining whether or not oil contamination of the holding surface 200 is present, as described above, it is possible to prevent oil contamination of the workpiece 17 held on the holding surface 200.

Similarly, by imaging the holding surface 712 of the robot 71 and the holding surface 732 of the spinner cleaning unit 73 by use of the cameras 80 and determining whether or not the first photoluminescence particles or the second photoluminescence particles are contained in the picked-up images, it is possible to examine whether or not oil contamination of the holding surface 712 and the holding surface 732 has occurred. As a result, oil contamination of the workpiece 17 can be prevented.

Similarly, at the time of imaging the holding surface 712 of the robot 71 and the holding surface 732 of the spinner cleaning unit 73 by use of the cameras 80, the holding surfaces 712 and 732 may be imaged from a direction slightly inclined relative to the perpendicular direction with respect to the holding surfaces 712 and 732. In this case, even if the part imaged is black in color, by recognizing the color of oil adhering to the black part, it is possible to determine whether or not the first photoluminescence particles or the second photoluminescence particles are contained in the black part.

Further, by finding that oil contamination has occurred, it is determined that the amount of the oil supplied to the ball screw 50 or the guide rails 51 of the horizontal moving mechanism 5 or the ball screw 40 or the guide rails 41 of the vertical moving mechanism 4 is improper, and improvement of the oil supply amount can be promoted, and malfunctions of the horizontal moving mechanism 5 and the vertical moving mechanism 4 can be prevented.

Note that, in the above embodiment, imaging by the camera 80 is conducted by setting the imaging area to be a darkroom by use of the light-shielding means 82; however, the light-shielding means 82 is not indispensable, and, in the case where adhesion of oil to the imaging area can be determined based on an image picked up without forming a darkroom, the light-shielding means 82 may not be used.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing apparatus comprising:
   a chuck table having a holding surface for holding a workpiece;
   a processing unit that processes the workpiece held on the holding surface;
   a horizontal moving mechanism that moves the chuck table in a horizontal direction relative to the processing unit and is supplied with a first oil containing first photoluminescence particles;
   a vertical moving mechanism that moves the processing unit in a vertical direction relative to the chuck table and is supplied with a second oil containing second photoluminescence particles;
   a camera that images the holding surface of the chuck table; and
   a light source that casts light to an imaging area of the camera inclusive of the holding surface,
   wherein presence or absence of adhesion of the first oil and/or the second oil to the holding surface can be detected based on an image of the holding surface picked up by the camera.

2. The processing apparatus according to claim 1,
   wherein the first photoluminescence particles emit light in a first color when irradiated with light of the light source,
   the second photoluminescence particles emit light in a second color different from the first color when irradiated with light of the light source, and
   a source of the scattered oil adhered to the holding surface is identified by observing the image picked up by the camera.

3. The processing apparatus according to claim 1, wherein the first and second photoluminescence particles have a light accumulating property.

* * * * *